United States Patent
Ohta et al.

(10) Patent No.: US 12,250,666 B2
(45) Date of Patent: Mar. 11, 2025

(54) BASE STATION DEVICE, RELAY DEVICE, AND COMMUNICATION SYSTEM

(71) Applicant: FUJITSU LIMITED, Kawasaki (JP)

(72) Inventors: Yoshiaki Ohta, Yokohama (JP); Ryuichi Takechi, Kawasaki (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 372 days.

(21) Appl. No.: 17/590,103

(22) Filed: Feb. 1, 2022

(65) Prior Publication Data

US 2022/0159655 A1 May 19, 2022

Related U.S. Application Data

(63) Continuation of application No. PCT/JP2019/032468, filed on Aug. 20, 2019.

(51) Int. Cl.
*H04W 72/0453* (2023.01)
*H04B 7/155* (2006.01)
(Continued)

(52) U.S. Cl.
CPC ........ *H04W 72/0453* (2013.01); *H04B 7/155* (2013.01); *H04W 84/042* (2013.01); *H04W 84/12* (2013.01); *H04W 88/06* (2013.01)

(58) Field of Classification Search
CPC ........... H04W 72/0453; H04W 84/042; H04W 84/12; H04W 88/06; H04W 88/10;
(Continued)

(56) References Cited

U.S. PATENT DOCUMENTS

| 2015/0110014 A1* | 4/2015 | Wang | H04L 63/0853 370/329 |
| 2015/0117357 A1* | 4/2015 | Ozturk | H04W 28/0205 370/329 |

(Continued)

FOREIGN PATENT DOCUMENTS

| CN | 109937610 A | 6/2019 |
| CN | 109982300 A | 7/2019 |

(Continued)

OTHER PUBLICATIONS

BGPP TS 36.133 V16.0.0, 3rd Generation Partnership Project; Technical Specification Group Radio Access Network; Evolved Universal Terrestrial Radio Access (E-UTRA); Requirements for support of radio resource management (Release 16), Dec. 2018.

(Continued)

*Primary Examiner* — Michael Y Mapa
(74) *Attorney, Agent, or Firm* — Myers Wolin, LLC

(57) ABSTRACT

A base station device includes a processor a communicator. The processor configured to perform, when a terminal device performs wireless communication by using both a first wireless communication method that is a wireless communication method with the base station device and a second wireless communication method that is a wireless communication method with a relay device, data communication by converging the wireless communication in a convergence layer in the first wireless communication method. The communicator configured to identify, even when the relay device relays data that is transmitted and/or received by the second wireless communication method to the base station device by any of the wireless communication methods of the first wireless communication method and the second wireless communication method, a bearer in (Continued)

the first wireless communication method to which the data belongs, and transmit and/or receive the data.

7 Claims, 14 Drawing Sheets

(51) Int. Cl.
*H04W 84/04* (2009.01)
*H04W 84/12* (2009.01)
*H04W 88/06* (2009.01)

(58) Field of Classification Search
CPC ....... H04W 76/15; H04W 4/00; H04W 16/26; H04B 7/155; H04B 7/15528
USPC .............................................. 370/315; 455/7
See application file for complete search history.

(56) References Cited

U.S. PATENT DOCUMENTS

| | | | |
|---|---|---|---|
| 2015/0305041 A1* | 10/2015 | Kim | H04W 72/542 370/329 |
| 2016/0255589 A1 | 9/2016 | Sato et al. | |
| 2018/0035440 A1 | 2/2018 | Ohta et al. | |
| 2019/0037433 A1 | 1/2019 | Nagasaka et al. | |
| 2019/0253924 A1 | 8/2019 | Kim et al. | |
| 2019/0349950 A1 | 11/2019 | Takano et al. | |
| 2022/0345938 A1* | 10/2022 | Gupta | H04W 88/10 |

FOREIGN PATENT DOCUMENTS

| | | |
|---|---|---|
| JP | 2016-525314 A | 8/2016 |
| JP | 2017-529762 A | 10/2017 |
| WO | 2015/009469 A1 | 1/2015 |
| WO | 2015/079821 A1 | 6/2015 |
| WO | 2016/028563 A1 | 2/2016 |
| WO | 2016/163036 A1 | 10/2016 |
| WO | 2017/170164 A1 | 10/2017 |

OTHER PUBLICATIONS

3GPP TS 36.211 V15.5.0, 3rd Generation Partnership Project; Technical Specification Group Radio Access Network; Evolved Universal Terrestrial Radio Access (E-UTRA); Physical channels and modulation (Release 15), Mar. 2019.
3GPP TS 36.212 V15.5.0, 3rd Generation Partnership Project; Technical Specification Group Radio Access Network; Evolved Universal Terrestrial Radio Access (E-UTRA); Multiplexing and channel coding (Release 15), Mar. 2019.
3GPP TS 36.213 V15.5.0, 3rd Generation Partnership Project; Technical Specification Group Radio Access Network; Evolved Universal Terrestrial Radio Access (E-UTRA); Physical layer procedures (Release 15), Mar. 2019.
3GPP TS 36.214 V15.3.0, 3rd Generation Partnership Project; Technical Specification Group Radio Access Network; Evolved Universal Terrestrial Radio Access (E-UTRA); Physical layer; Measurements (Release 15), Sep. 2018.
3GPP TS 36.300 V15.5.0, 3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 15), Mar. 2019.
3GPP TS 36.321 V15.5.0, 3rd Generation Partnership Project; Technical Specification Group Radio Access Network; Evolved Universal Terrestrial Radio Access (E-UTRA); Medium Access Control (MAC) protocol specification (Release 15), Mar. 2019.
3GPP TS 36.322 V15.1.0, 3rd Generation Partnership Project; Technical Specification Group Radio Access Network; Evolved Universal Terrestrial Radio Access (E-UTRA); Radio Link Control (RLC) protocol specification (Release 15), Jul. 2018.
3GPP TS 36.323 V15.3.0, 3rd Generation Partnership Project; Technical Specification Group Radio Access Network; Evolved Universal Terrestrial Radio Access (E-UTRA); Packet Data Convergence Protocol (PDCP) specification (Release 15), Mar. 2019.
3GPP TS 36.331 V15.5.1, 3rd Generation Partnership Project; Technical Specification Group Radio Access Network; Evolved Universal Terrestrial Radio Access (E-UTRA); Radio Resource Control (RRC); Protocol specification (Release 15), Apr. 2019.
3GPP TS 36.413 V15.5.0, 3rd Generation Partnership Project; Technical Specification Group Radio Access Network; Evolved Universal Terrestrial Radio Access Network (E-UTRAN); S1 Application Protocol (S1AP) (Release 15), Mar. 2019.
3GPP TS 36.423 V15.5.0, 3rd Generation Partnership Project; Technical Specification Group Radio Access Network; Evolved Universal Terrestrial Radio Access Network (E-UTRAN); X2 application protocol (X2AP) (Release 15), Mar. 2019.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.340 V15.5.0, 3rd Generation Partnership Project; Technical Specification Group Radio Access Network; Evolved Universal Terrestrial Radio Access (E-UTRA) and NR; Multi-connectivity; Stage 2 (Release 15), Mar. 2019.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.4.0, 3rd Generation Partnership Project; Technical Specification Group Radio Access Network; NR; Services provided by the physical layer (Release 15), Dec. 2018.
3GPP TS 38.211 V15.5.0, 3rd Generation Partnership Project; Technical Specification Group Radio Access Network; NR; Physical channels and modulation (Release 15), Mar. 2019.
3GPP TS 38.212 V15.5.0, 3rd Generation Partnership Project; Technical Specification Group Radio Access Network; NR; Multiplexing and channel coding (Release 15), Mar. 2019.
3GPP TS 38.213 V15.5.0, 3rd Generation Partnership Project; Technical Specification Group Radio Access Network; NR; Physical layer procedures for control (Release 15), Mar. 2019.
3GPP TS 38.214 V15.5.0, 3rd Generation Partnership Project; Technical Specification Group Radio Access Network; NR; Physical layer procedures for data (Release 15), Mar. 2019.
3GPP TS 38.215 V15.5.0, 3rd Generation Partnership Project; Technical Specification Group Radio Access Network; NR; Physical layer measurements (Release 15), Jun. 2019.
3GPP TS 38.300 V15.5.0, 3rd Generation Partnership Project; Technical Specification Group Radio Access Network; NR; NR and NG-RAN Overall Description; Stage 2 (Release 15), Mar. 2019.
3GPP TS 38.321 V15.5.0, 3rd Generation Partnership Project; Technical Specification Group Radio Access Network; NR; Medium Access Control (MAC) protocol specification (Release 15), Mar. 2019.
3GPP TS 38.322 V15.5.0, 3rd Generation Partnership Project; Technical Specification Group Radio Access Network; NR; Radio Link Control (RLC) protocol specification (Release 15), Mar. 2019.
3GPP TS 38.323 V15.5.0, 3rd Generation Partnership Project; Technical Specification Group Radio Access Network; NR; Packet Data Convergence Protocol (PDCP) specification (Release 15), Mar. 2019.
3GPP TS 37.324 V15.1.0, 3rd Generation Partnership Project; Technical Specification Group Radio Access Network; E-UTRA and NR; Service Data Adaptation Protocol (SDAP) specification (Release 15), Sep. 2018.
3GPP TS 38.331 V15.5.1, 3rd Generation Partnership Project; Technical Specification Group Radio Access Network; NR; Radio Resource Control (RRC) protocol specification (Release 15), Apr. 2019.
3GPP TS 38.401 V15.5.0, 3rd Generation Partnership Project; Technical Specification Group Radio Access Network; NG-RAN; Architecture description (Release 15), Mar. 2019.
3GPP TS 38.410 V15.2.0, 3rd Generation Partnership Project; Technical Specification Group Radio Access Network; NG-RAN; NG general aspects and principles (Release 15), Dec. 2018.

(56) References Cited

OTHER PUBLICATIONS

3GPP TS 38.413 V15.3.0, 3rd Generation Partnership Project; Technical Specification Group Radio Access Network; NG-RAN; NG Application Protocol (NGAP) (Release 15), Mar. 2019.
3GPP TS 38.420 V15.2.0, 3rd Generation Partnership Project; Technical Specification Group Radio Access Network; NG-RAN; Xn general aspects and principles (Release 15), Dec. 2018.
3GPP TS 38.423 V15.3.0, 3rd Generation Partnership Project; Technical Specification Group Radio Access Network; NG-RAN; Xn application protocol (XnAP) (Release 15), Mar. 2019.
BGPP TS 38.470 V15.5.0, 3rd Generation Partnership Project; Technical Specification Group Radio Access Network; NG-RAN; F1 general aspects and principles (Release 15), Mar. 2019.
BGPP TS 38.473 V15.5.0, 3rd Generation Partnership Project; Technical Specification Group Radio Access Network; NG-RAN; F1 application protocol (F1AP) (Release 15), Mar. 2019.
BGPP TS 23.501 V16.1.0, 3rd Generation Partnership Project; Technical Specification Group Services and System Aspects; System Architecture for the 5G System; Stage 2 (Release 16), Jun. 2019.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TS 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TS 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TS 38.900 V15.0.0, "3rd Generation Partnership Project; Technical Specification Group Radio Access Network; Study on channel model for frequency spectrum above 6 GHZ (Release 15)", Jun. 2018.
3GPP TS 38.912 V15.0.0, "3rd Generation Partnership Project; Technical Specification Group Radio Access Network; Study on New Radio (NR) access technology (Release 15)", Jun. 2018.
3GPP TS 38.913 V15.0.0, "3rd Generation Partnership Project; Technical Specification Group Radio Access Network; Study on Scenarios and Requirements for Next Generation Access Technologies; (Release 15)", Jun. 2018.
3GPP TS 38.889 V16.0.0, "3rd Generation Partnership Project; Technical Specification Group Radio Access Network; Study on NR-based access to unlicensed spectrum (Release 16), Dec. 2018.
OPPO, "Discussion on UE-based data duplication enhancement", Agenda Item: 11.7.4, 3GPP TSG-RAN WG2 Meeting #107, R2-1910024, Prague, Czech, Aug. 26-30, 2019.
LG Electronics, Inc et al., "PDCP duplication on split bearer", Agenda Item: 11.7.4 (NR_IIOT-Core), 3GPP TSG-RAN WG2 Meeting #107, R2-1909815, Prague, Czech Republic, Aug. 26-30, 2019.
International Search Report with the Written Opinion of the International Searching Authority issued by the Japan Patent office for corresponding International Patent Application No. PCT/JP2019/032468, with a partial English translation.
First Notification of Office Action and Search Report issued by the China National Intellectual Property Administration for corresponding Chinese Patent Application No. 201980099469.6, dated Jul. 29, 2023, with an English translation.

\* cited by examiner

BASE STATION DEVICE, RELAY DEVICE, AND COMMUNICATION SYSTEM

CROSS-REFERENCE TO RELATED APPLICATION

This application is a continuation application of International Application PCT/JP2019/032468 filed on Aug. 20, 2019 and designated the U.S., the entire contents of which are incorporated herein by reference.

FIELD

The present invention relates to a base station device, a relay device, and a communication system.

BACKGROUND

In current network, traffic of mobile terminals (smartphones and feature phones) account for a majority network resources. In addition, the traffic used by the mobile terminals tends to expand.

Meanwhile, with development of Internet of things (IoT) services (for example, transportation systems, smart meters, and monitoring systems of devices or the like), it has been demanded to cope with services including various requirement. Consequently, in communication standard for fifth generation mobile communication (5G or new radio (NR)), in addition to the fourth generation mobile communication (4G), a techniques, which achieve a higher data rate, a larger capacity, and lower latency. Note that, for the fifth generation communication standards, 3GPP working groups (for example, TSG-RAN WG1 and TSG-RAN WG2) have been making a progress on the technical study, and the first edition of standard specification was released in the end of 2017 (Non-Patent Documents 12 to 40).

As described above, in order to cope with variety of services, the 5G assumes support of many use cases classified into enhanced mobile broadband (eMBB), massive machine type communications (MTC), and ultra-reliable and low latency communication (URLLC).

The standard technology of fourth generation mobile communication (4G) defines LTE-WLAN aggregation and LTE/WLAN Radio Level Integration with IPsec Tunnel (Non-Patent Document 5). The LTE-WLAN aggregation and the LTE/WLAN Radio Level Integration with IPsec Tunnel are technologies that enable communication by using an LTE communication network and a WLAN communication network. For example, in the LTE-WLAN aggregation, for a signal set in a Split LWA Bearer, after a PDCP layer (PDCP layer corresponding to the Split LWA Bearer) of a base station is processed, either an RLC layer (for example, the LTE communication network) and an LWAAP layer (for example, the WLAN communication network) is processed. When the RLC layer is processed, a MAC layer is processed, and when the LWAAP layer is processed, a WLAN layer is processed.

Technologies related to the 5G are described in the following prior art documents.

Related techniques are disclosed in 3GPP TS 36.133 V16.0.0 (2018-12), 3GPP TS 36.211 V15.5.0 (2019-03), 3GPP TS 36.212 V15.5.0 (2019-03), 3GPP TS 36.213 V15.5.0 (2019-03), 3GPP TS 36.214 V15.3.0 (2018-09), 3GPP TS 36.300 V15.5.0 (2019-03), 3GPP TS 36.321 V15.5.0 (2019-03), 3GPP TS 36.322 V15.1.0 (2018-07), 3GPP TS 36.323 V15.3.0 (2019-03), 3GPP TS 36.331 V15.5.1 (2019-04), 3GPP TS 36.413 V15.5.0 (2019-03), 3GPP TS 36.423 V15.5.0 (2019-03), 3GPP TS 36.425 V15.0.0 (2018-06), 3GPP TS 37.340 V15.5.0 (2019-03), 3GPP TS 38.201 V15.0.0 (2017-12), 3GPP TS 38.202 V15.4.0 (2018-12), 3GPP TS 38.211 V15.5.0 (2019-03), 3GPP TS 38.212 V15.5.0 (2019-03), 3GPP TS 38.213 V15.5.0 (2019-03), 3GPP TS 38.214 V15.5.0 (2019-03), 3GPP TS 38.215 V15.5.0 (2019-03), 3GPP TS 38.300 V15.5.0 (2019-03), 3GPP TS 38.321 V15.5.0 (2019-03), 3GPP TS 38.322 V15.5.0 (2019-03), 3GPP TS 38.323 V15.5.0 (2019-03), 3GPP TS 37.324 V15.1.0 (2018-09), 3GPP TS 38.331 V15.5.1 (2019-04), 3GPP TS 38.401 V15.5.0 (2019-03), 3GPP TS 38.410 V15.2.0 (2018-12), 3GPP TS 38.413 V15.3.0 (2019-03), 3GPP TS 38.420 V15.2.0 (2018-12), 3GPP TS 38.423 V15.3.0 (2019-03), 3GPP TS 38.470 V15.5.0 (2019-03), 3GPP TS 38.473 V15.5.0 (2019-03), 3GPP TS 23.501 V16.1.0 (2019-06), 3GPP TR 38.801 V14.0.0 (2017-03), 3GPP TR 38.802 V14.2.0 (2017-09), 3GPP TR 38.803 V14.2.0 (2017-09), 3GPP TR 38.804 V14.0.0 (2017-03), 3GPP TR 38.900 V15.0.0 (2018-06), 3GPP TR 38.912 V15.0.0 (2018-06), 3GPP TR 38.913 V15.0.0 (2018-06), and 3GPP TR 38.889 V16.0.0 (2018-12).

SUMMARY

According to an aspect of the embodiments, a base station device in a communication system including a terminal device, the base station device, and a relay device that relays communication between the terminal device and the base station device, the base station device includes: a processor configured to perform, when the terminal device performs wireless communication by using both a first wireless communication method that is a wireless communication method with the base station device and a second wireless communication method that is a wireless communication method with the relay device, data communication by converging the wireless communication in a convergence layer in the first wireless communication method; and a communicator configured to: identify, even when the relay device relays data that is transmitted and/or received by the second wireless communication method to the base station device by any of the wireless communication methods of the first wireless communication method and the second wireless communication method, a bearer in the first wireless communication method to which the data belongs, and transmit and/or receive the data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the 5G, there are no clear definitions similar to the LTE-WLAN aggregation and the LTE/WLAN Radio Level Integration with IPsec Tunnel in the 4G.

In order to implement IoT services in the 5G, for example, a terminal device may perform DC duplication and transmit the same duplicated data a plurality of times. In this case, for example, the terminal device transmits the data by using different paths in order to increase a probability of arrival of the data. Assuming such a case, in the 5G, it is needed to define a communication standard using a plurality of paths. The plurality of paths are, for example, a path that directly connects a base station device (gNB) from the terminal device wirelessly and a path via a relay device (communication device) between the terminal device and the base station device.

Therefore, a base station device, a relay device, and a communication system that relay communication between the terminal device and the base station device in 5G are provided.

Hereinafter, the present embodiments will be described in detail with reference to the drawings. Problems and examples in the present description are examples and do not limit the scope of rights of the present application. In particular, as long as the described expressions are technologically equivalent even if the described expressions are different, the technologies of the present application may be applied and the scope of rights is not limited even if the expressions are different.

First Embodiment

A first embodiment will be described.

Figure 1:
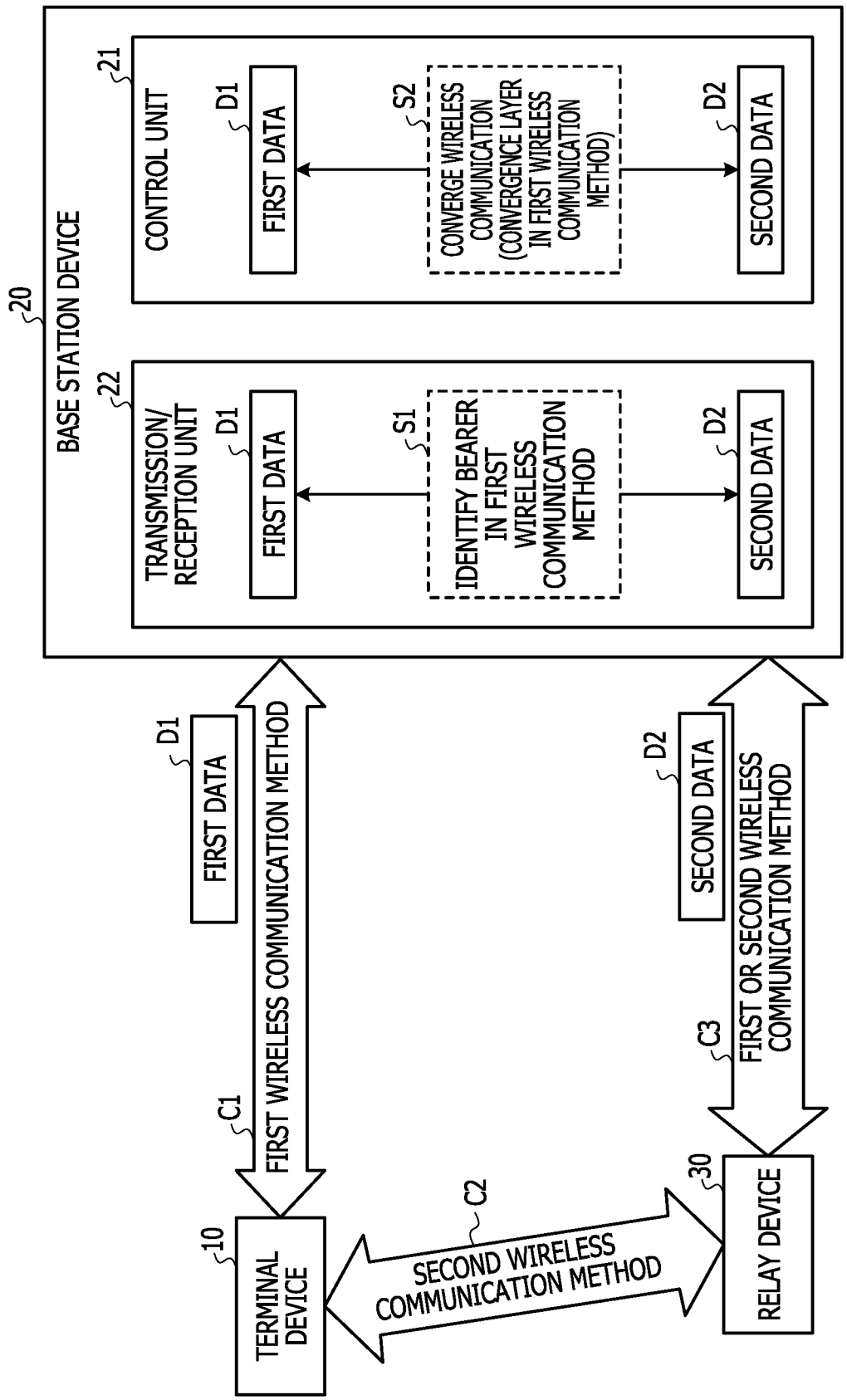
FIG. 1 is a diagram illustrating an example of a wireless communication system 1 in a first embodiment.

FIG. 1 is a diagram illustrating an example of a wireless communication system 1 in the first embodiment. The wireless communication system 1 includes a terminal device 10, a base station device 20, and a relay device 30.

For example, when the terminal device 10 transmits data to the base station device 20 or to another communication device via the base station device 20, the terminal device 10 may duplicate the data to be transmitted and transmits the duplicated data by using a plurality of paths. The plurality of paths includes, for example, a path directly connected to the base station device 20 wirelessly and a path in which the relay device 30 connected wirelessly relays and transmits data to the base station device 20.

The terminal device 10 and the base station device 20 perform wireless communication by a first wireless communication method (communication C1). Then, the terminal device 10 and the base station device 20 transmit/receive first data D1 by the first wireless communication method.

Furthermore, the terminal device 10 and the relay device 30 perform wireless communication by a second wireless communication method (communication C2). Then, the terminal device 10 and the relay device 30 transmit/receive second data D2 by the second wireless communication method. Note that, the second wireless communication method is not limited to wireless communication or wired communication, and may also be an interface.

The relay device 30 and the base station device 20 perform wireless communication by the first wireless communication method or the second wireless communication method (communication C3). Then, the relay device 30 and the base station device 20 transmit/receive the second data D2 by the first wireless communication method or the second wireless communication method.

When the terminal device 10 performs wireless communication with the base station device 20, the terminal device 10 may use both the communication C1 in which the terminal device 10 is directly connected to the base station device 20 wirelessly and the communication C2 and the communication C3 in which the communication is performed via the relay device 30. In this case, the first data D1 and the second data D2 transmitted by the terminal device 10 may also be, for example, the same duplicated data.

The relay device 30 uses the communication C2 and the communication C3 to relay wireless communication between the terminal device 10 and the base station device 20.

The base station device 20 includes a control unit 21 and a transmission/reception unit 22. When the terminal device 10 performs data transmission (wireless communication) by using the communication C1 and both of the communication C2 and the communication C3, the transmission/reception unit 22 receives the first data D1 via the communication C1 and the second data D2 via the communication C3. The first data D1 is data transmitted by the first wireless communication method, and is data compatible with (conforming to) the first wireless communication method. On the other hand, the second data D2 is data transmitted by either the first wireless communication method or the second wireless communication method, and is data compatible with (conforming to) either the first wireless communication method or the second wireless communication method. The transmission/reception unit 22 may identify a bearer in the first wireless communication method of each piece of data regardless of by which wireless communication method the second data D2 is transmitted (S1).

When the second data D2 is data transmitted by the second wireless communication method, the base station device 20 may identify the first data D1 and the second data D2 as different bearers by, for example, managing an identifier of a communication partner device such as the terminal device 10 or the relay device 30 and each bearer in association with each other.

On the other hand, for example, when the second data D2 is data transmitted by the first wireless communication method, since the first data D1 and the second data D2 are data transmitted from the same terminal device 10 by the same wireless communication method, the base station device 20 performs the processing S1 to identify each as a different bearer.

The control unit 21 may converge wireless communication by a layer (convergence layer) that converges each piece of data by wireless communication in the first wireless communication method regardless of by which wireless communication method the second data D2 is transmitted (S2).

For example, when the second data D2 is data transmitted by the second wireless communication method, the base station device 20 performs the processing S2 to converge the second data D2 by the convergence layer of the first wireless communication method. The base station device 20 performs communication by regarding communication with the terminal device 10 which is a first communication device and communication with the relay device 30 which is a second communication device as communication with the same communication device. Although the base station device 20 actually performs a plurality of (two in this case) types of communication with different communication devices (terminal device 10 and relay device 30) through different communication paths (communication C1 and communication C3), the base station device 20 regards this plurality of types of communication as one type of communication performed with one terminal device (for example, terminal device 10). For example, the base station device 20 may regard the relay device 30 as a relay station in communication with the terminal device 10, and may recognize communication with the relay device 30 as communication with the terminal device 10.

In the first embodiment, for example, in a case where the base station device 20 is a base station device compatible with 5G, the base station device 20 may cope with simultaneous transmission of data of the terminal device 10 in 5G through another path.

Second Embodiment

A second embodiment will be described.
<Exemplary Configuration of Wireless Communication System>

Figure 2:
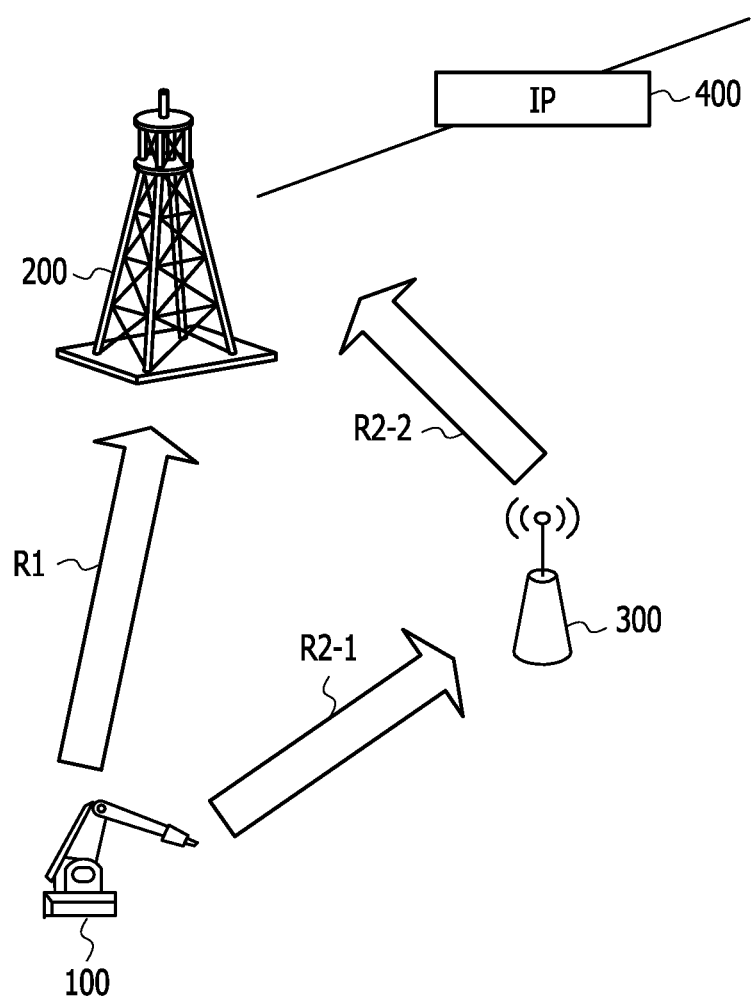
FIG. 2 is a diagram illustrating an exemplary configuration of a communication system 11.

FIG. 2 is a diagram illustrating an exemplary configuration of a communication system 11. The communication system 11 includes a terminal device (communication device) 100, a base station device 200, a relay device (communication device) 300, and an internet protocol (IP) network 400. The communication system 11 is, for example, a wireless communication system that performs wireless communication conforming to 5G. The base station device 200 is, for example, a gNodeB (gNB). Furthermore, the terminal device 100 is a device that performs communication with the base station device 200 or with another communication device via the base station device 200, and is, for example, a mobile communication terminal such as a smartphone or a tablet terminal. Furthermore, the terminal device 100 may also be, for example, a working machine installed in a factory or an unmanned traveling vehicle. Moreover, the terminal device 100 is a communication device capable of performing wireless communication conforming to IoT services (for example, compatible with URLLC).

The terminal device 100 transmits data to, for example, another communication device on the IP network 400. The terminal device 100 may, for example, perform DC duplication (duplicate transmission, simultaneous transmission) and transmit data to another communication device.

The DC duplication is, for example, a data transmission method in which data is duplicated when an URLLC data transmission trigger occurs and the data is transmitted by using a plurality of paths. In the DC duplication, by transmitting the data through the plurality of paths, the terminal device 100 improves a probability that the data reaches a destination, and achieves high reliability. Furthermore, by transferring, to the destination, data received first among the data received through the plurality of paths, the base station device 200 may transmit the data to the destination in a shorter time, and achieves low latency.

The terminal device 100 duplicates, for example, data to be transmitted in the DC duplication. Then, the terminal device 100 transmits one of the duplicated data to the base station device 200 via wireless communication directly connected to the base station device 200 (path R1). Moreover, the terminal device 100 transmits another one of the duplicated data to the base station device 200 (path R2-2) via the relay device 300 (path R2-1). When the base station device 200 receives the data from either one of the path R1 or the path R2-2, the base station device 200 transmits the data to the IP network 400 and transmits the data to a destination communication device.

Furthermore, communication between the terminal device 100 and the relay device 300 may also be an interface. For example, the relay device 300 may also be an external terminal device or a dongle type terminal device. In this case, the terminal device 100 and the relay device 300 may also be, for example, a communication terminal that is connected a computer such as a notebook PC.
<Exemplary Structure of Relay Device>

Figure 3:
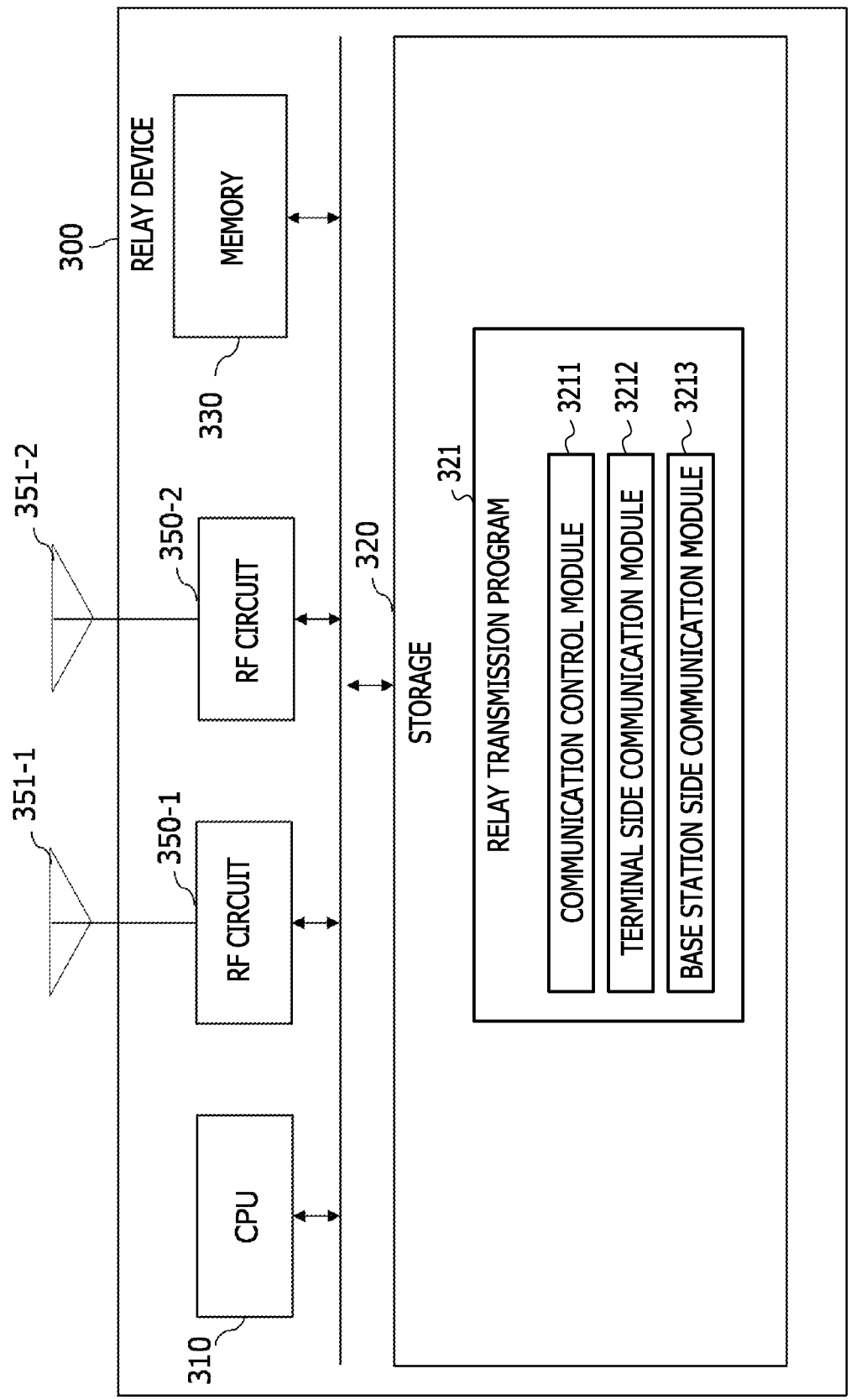
FIG. 3 is a diagram illustrating an exemplary structure of a relay device 300.

FIG. 3 is a diagram illustrating an exemplary structure of the relay device 300. The relay device 300 is a communication device that relays communication between the terminal device 100 and the base station device 200. The relay device 300 is, for example, a relay device (wireless LAN (WLAN) termination: WT) compatible with short-range wireless communication such as Wi-Fi.

The relay device 300 includes a central processing unit (CPU) 310, a storage 320, a memory 330 such as a dynamic random access memory (DRAM), and radio frequency (RF) circuits 350-1 and 350-2.

The storage 320 is an auxiliary storage device that stores programs and data, such as a flash memory, a hard disk drive (HDD), or a solid state drive (SSD). The storage 320 stores a relay transmission program 321.

The memory 330 is an area into which a program stored in the storage 320 is loaded. Furthermore, the memory 330 is also used as an area in which the program stores data.

The RF circuits 350-1 and 350-2 are devices that are wirelessly connected to the terminal device 100 and the base station device 200.

The RF circuit 350-1 is, for example, a wireless device compatible with Wi-Fi and is wirelessly connected to the terminal device 100. The RF circuit 350-1 includes an antenna 351-1 corresponding to a corresponding wireless protocol.

The RF circuit 350-2 is, for example, a wireless device compatible with an NR and is wirelessly connected to the base station device 200. The RF circuit 350-2 includes an antenna 351-2 corresponding to a corresponding wireless protocol. Note that the RF circuit 350-2 may be a wireless device corresponding to a protocol wirelessly connected to the base station device 200, and may also be a wireless device corresponding to other than the NR.

The CPU 310 is a processor or computer that implements each processing by loading a program stored in the storage 320 into the memory 330 and executing the loaded program.

The CPU 310 constructs an inter-terminal communication unit and an inter-base station communication unit to perform relay transmission control processing, by executing the relay transmission program 321. The relay transmission control processing is processing of relaying, transmitting, and controlling communication between the terminal device 100 and the base station device 200.

The CPU 310 constructs the inter-terminal communication unit, an inter-base station communication unit relay unit, and a conversion unit to perform communication control processing, by executing a communication control module 3211 included in the relay transmission program 321. The communication control processing is processing of controlling relay transmission in which data received from the terminal device 100 is transmitted to the base station device 200 and data received from the base station device 200 is transmitted to the terminal device 100.

The CPU 310 constructs the inter-terminal communication unit, the inter-base station communication unit relay unit, and the conversion unit to perform terminal side communication processing, by executing a terminal side communication module 3212 included in the relay transmission program 321. The terminal side communication processing is processing of performing wireless connection and data transmission/reception with the terminal device 100.

The CPU 310 constructs the inter-terminal communication unit, the inter-base station communication unit relay unit, and the conversion unit to perform base station side communication processing, by executing a base station side communication module 3213 included in the relay transmission program 321. The base station side communication processing is processing of executing wireless connection and data transmission/reception with the base station device 200.

<Exemplary Structure of Base Station Device 200>

Figure 4:
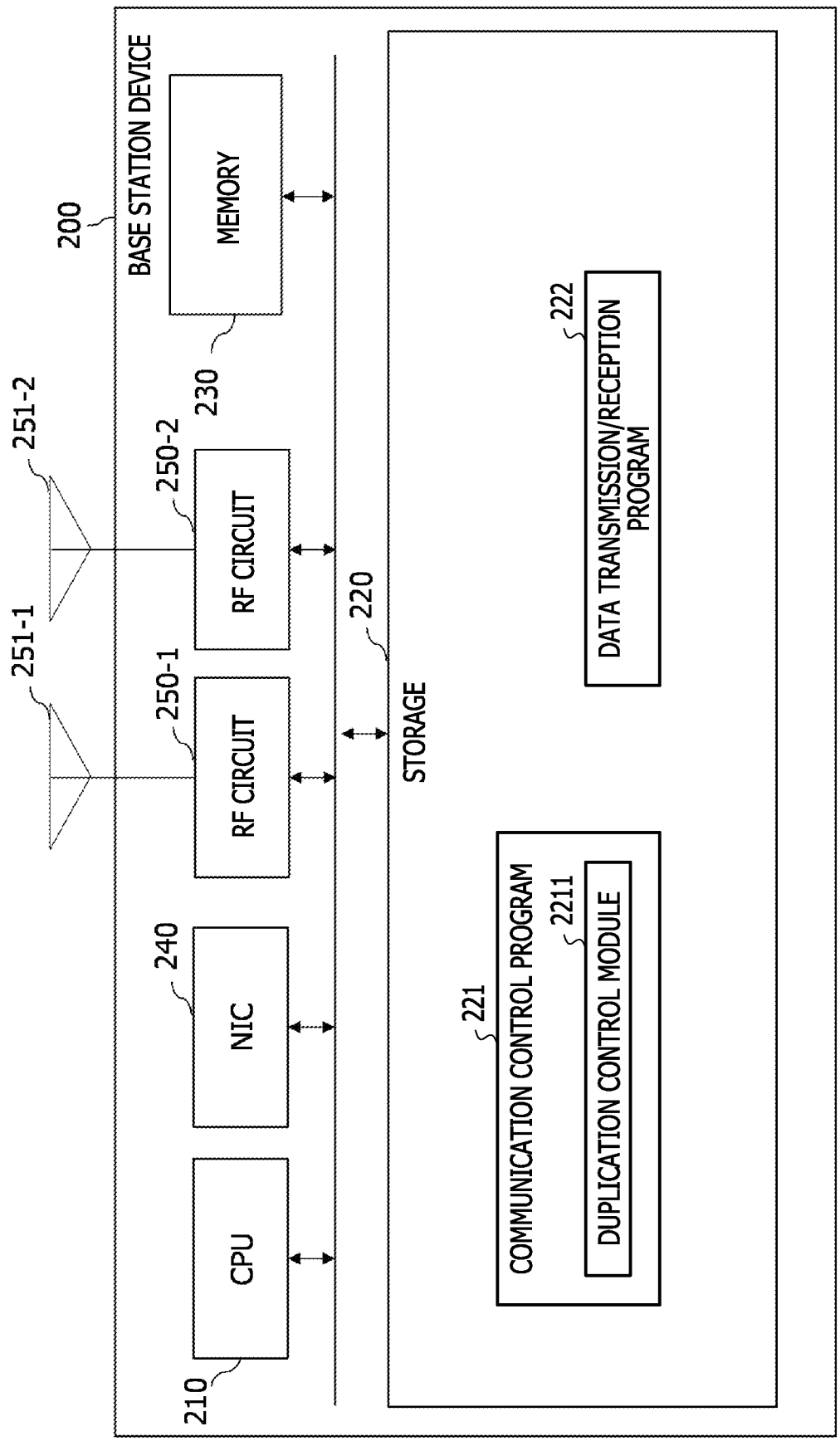
FIG. 4 is a diagram illustrating an exemplary structure of a base station device 200.

FIG. 4 is a diagram illustrating an exemplary structure of the base station device 200. The base station device 200 is, for example, a communication device that performs wireless communication with the relay device 300 and the terminal device 100. The base station device 200 includes a CPU 210, a storage 220, a memory 230 such as a DRAM, a network interface card (NIC) 240, and RF circuits 250-1 and 250-2.

The storage 220 is an auxiliary storage device that stores programs and data, such as a flash memory, an HDD, or an SSD. The storage 220 stores a communication control program 221 and a data transmission/reception program 222.

The memory 230 is an area into which a program stored in the storage 220 is loaded. Furthermore, the memory 230 is also used as an area in which the program stores data.

The RF circuits 250-1 and 250-2 are devices that are wirelessly connected to the terminal device 100 and the relay device 300.

The RF circuit 250-1 is, for example, a wireless device compatible with the NR and is wirelessly connected to the terminal device 100. The RF circuit 250-1 has an antenna 251-1 corresponding to a corresponding wireless protocol.

The RF circuit 250-2 is, for example, a wireless device compatible with Wi-Fi and is wirelessly connected to the relay device 300. The RF circuit 250-2 includes an antenna 251-2 corresponding to a corresponding wireless protocol. Note that the RF circuit 250-2 may be a wireless device corresponding to a protocol wirelessly connected to the relay device 300, and may also be a wireless device corresponding to other than Wi-Fi. The RF circuit 250-2 is compatible with the NR when, for example, the protocol wirelessly connected to the relay device 300 is compatible with the NR.

The CPU 210 is a processor or computer that implements each processing by loading a program stored in the storage 220 into the memory 230 and executing the loaded program.

The CPU 210 constructs a transmission/reception unit and a control unit to perform communication control processing, by executing the communication control program 221. The communication control processing is processing of controlling communication directly connected to the terminal device 100 and communication relayed via the relay device 300.

The CPU 210 constructs the control unit and the transmission/reception unit to perform duplication control processing, by executing a duplication control module 2211 included in the communication control program 221. The duplication control processing is processing of controlling the same data received through a plurality of paths and controlling transmission of an ACK/NACK to a transmission source device.

The CPU 210 constructs the transmission/reception unit to perform data transmission/reception processing, by executing the data transmission/reception program 222. The data transmission/reception processing is processing of transmitting/receiving data in communication between the terminal device 100 and the relay device 300.

<Exemplary Structure of Terminal Device 100>

Figure 5:
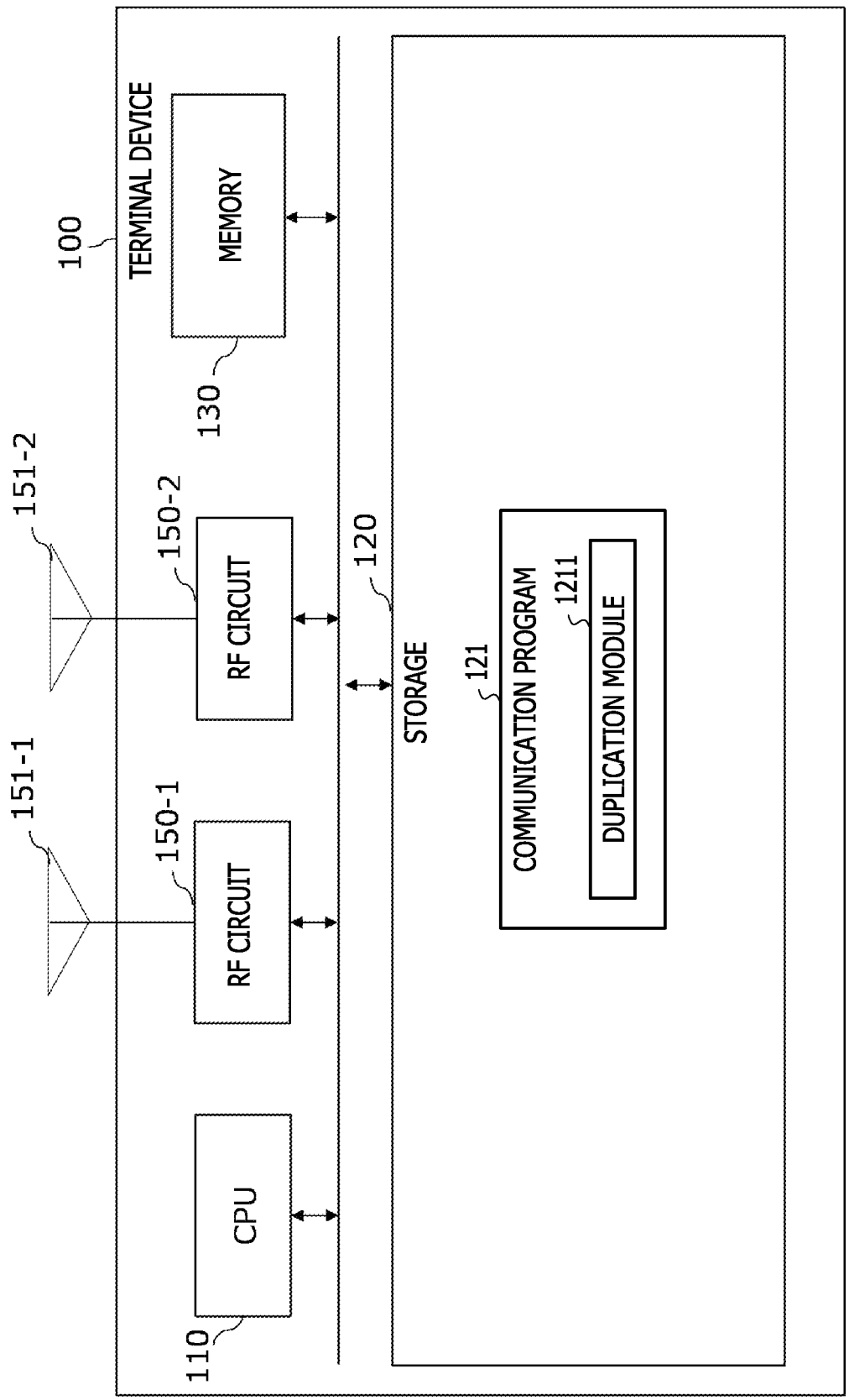
FIG. 5 is a diagram illustrating an exemplary structure of a terminal device 100.

FIG. 5 is a diagram illustrating an exemplary structure of the terminal device 100. The terminal device 100 is a communication device that performs wireless communication with the relay device 300 and the base station device 200.

The terminal device 100 includes a CPU 110, a storage 120, a memory 130 such as a DRAM, and RF circuits 150-1 and 150-2.

The storage 120 is an auxiliary storage device that stores programs and data, such as a flash memory, an HDD, or an SSD. The storage 120 stores a communication program 121.

The memory 130 is an area into which a program stored in the storage 120 is loaded. Furthermore, the memory 130 is also used as an area in which the program stores data.

The RF circuits 150-1 and 150-2 are devices that are wirelessly connected to the relay device 300 and the base station device 200.

The RF circuit 150-1 is, for example, a wireless device compatible with Wi-Fi and is wirelessly connected to the relay device 300. The RF circuit 150-1 includes an antenna 151-1 corresponding to a corresponding wireless protocol.

The RF circuit 150-2 is, for example, a wireless device compatible with the NR and is wirelessly connected to the base station device 200. The RF circuit 150-2 includes an antenna 151-2 corresponding to a corresponding wireless protocol.

The CPU 110 is a processor or computer that implements each processing by loading a program stored in the storage 120 into the memory 130 and executing the loaded program.

The CPU 110 constructs a first communication unit and a second communication unit to perform communication processing, by executing the communication program 121. The communication processing is processing of controlling communication with the relay device 300 and the base station device 200.

The CPU 110 constructs the first communication unit and the second communication unit to perform duplication processing, by executing a duplication module 1211 included in the communication program 121. The duplication processing is processing of performing the DC duplication, which is processing of duplicating data and transmitting the duplicated data to the relay device 300 and the base station device 200.

<Data Transmission in DC Duplication>

An example of data transmission processing in the DC duplication is indicated below. Note that there are three examples of the data transmission processing, pattern 1 to pattern 3, and each of the examples will be described below.

<1. Data Transmission Processing>

<1.1 Pattern 1>

Figure 6:
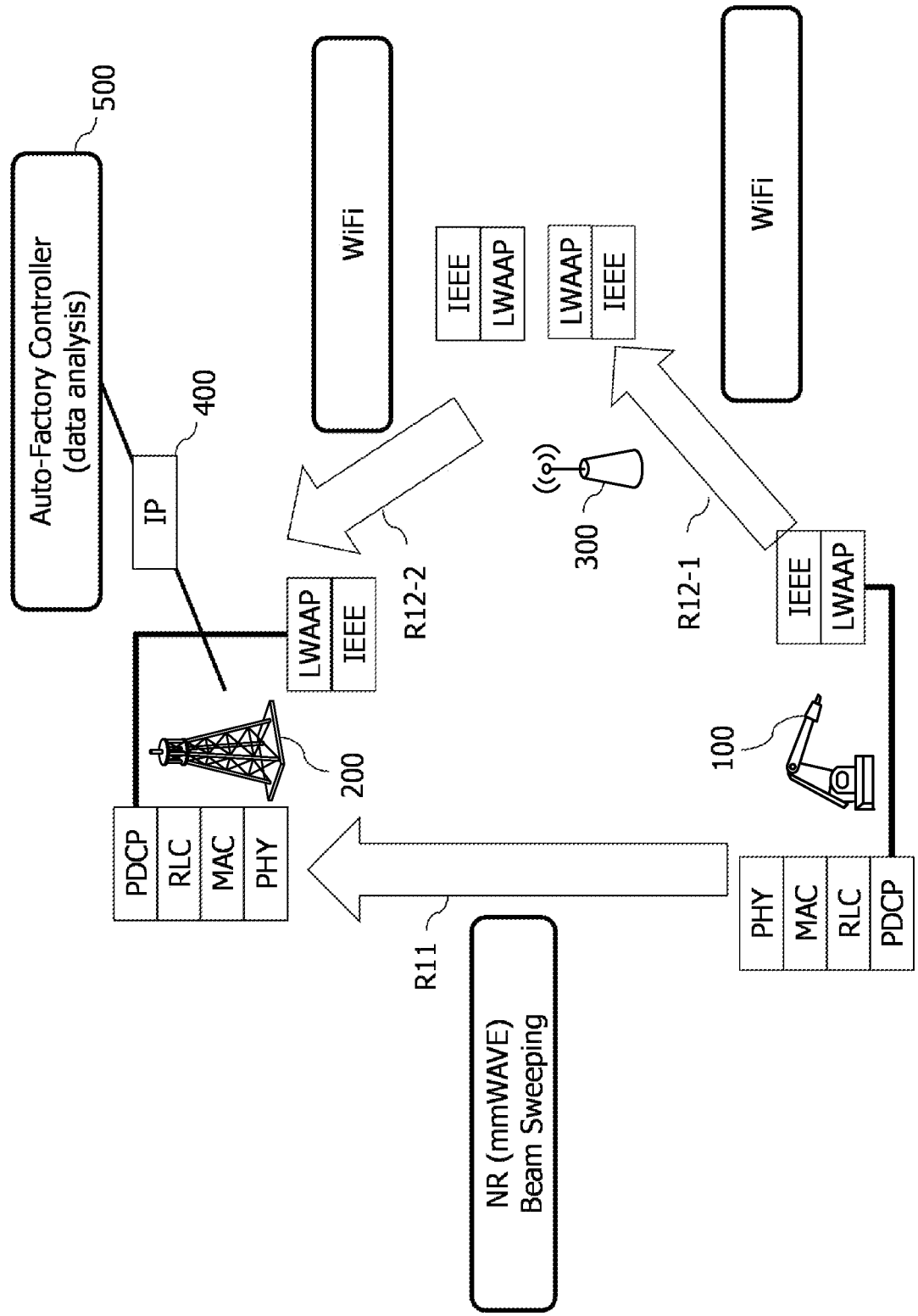
FIG. 6 is a diagram illustrating an example of data transmission (pattern 1) in DC duplication.

FIG. 6 is a diagram illustrating an example of data transmission (pattern 1) in the DC duplication. For example, the terminal device 100 performs data transmission by using the DC duplication when an URLLC data transmission trigger occurs. The terminal device 100 transmits data by using two paths (path R11 and path R12-1) in the DC duplication.

In the path R11, the terminal device 100 performs wireless communication compatible with the NR with the base station device 200. The NR in the path R11 includes, for example, wireless communication function using millimeter waves (mmWAVE), and a beam sweeping function for performing transmission by switching a beam direction. The terminal device 100 uses the path R11 to transmit the data to the base station device 200.

In the data communication in the path R11, each of the base station device 200 and the terminal device 100 supports layers (hierarchical layers) conforming to the NR and transmits/receives the data. The layers supported by the base station device 200 and the terminal device 100 in the path R11 include, for example, a physical (PHY) layer as a layer 1, a medium access control (MAC) layer as a layer 2, a radio link control (RLC) layer, and a packet data convergence protocol (PDCP) layer.

On the other hand, in the path R12-1, the terminal device 100 performs wireless communication compatible with Wi-Fi (WLAN) with the relay device 300. The terminal device 100 and the relay device 300 perform communication in the path R12-1 on the basis of, for example, a specification standardized by the Institute of Electrical and Electronics Engineers (IEEE). Furthermore, the terminal device 100 converts PDCP data into data that may be transmitted on Wi-Fi by using, for example, an LTE-WLAN aggregation adaptation protocol (LWAAP) or a tunneling protocol which is compatible with the NR and is similar to the LWAAP. Furthermore, the relay device 300 uses the LWAAP to convert, for example, received data into data that may be transmitted by the N R.

Note that, communication between the terminal device 100 and the relay device 300 may also be, for example, communication other than the WLAN, such as communication based on LTE, communication based on WCDMA (registered trademark), or communication compatible with Bluetooth (registered trademark).

When the relay device 300 receives the data in the path R12-1, the relay device 300 transmits the data to the base station device 200 using a path R12-2. With this, the relay device 300 relays the data transmitted by the terminal device 100 to the base station device 200.

For example, the relay device 300 converts PDCP data in the NR into data that may be transmitted by Wi-Fi by the LWAAP, and uses the path R12-2 to transmit the data to the base station device 200. Note that, when receiving the data by the Wi-Fi method in the path R12-1, the relay device 300 may also transfer the data to the base station device 200 by the Wi-Fi method in the path R12-2 without converting the received data into PDCP data. In this case, the relay device 300 does not have to be compatible with the LWAAP.

The base station device 200 receives data via each of the path Rh and the path R12-2. The base station device 200 transmits, for example, previously received data to the IP network 400 and transmits the data to a destination. The base station device 200 discards, for example, data that is not transmitted.

For example, when the terminal device 100 is a working device installed in a factory, the destination is a factory management control system (auto-factory controller) 500 that manages and analyzes an operating status of the working device in the factory and controls the working device.

Figure 7:
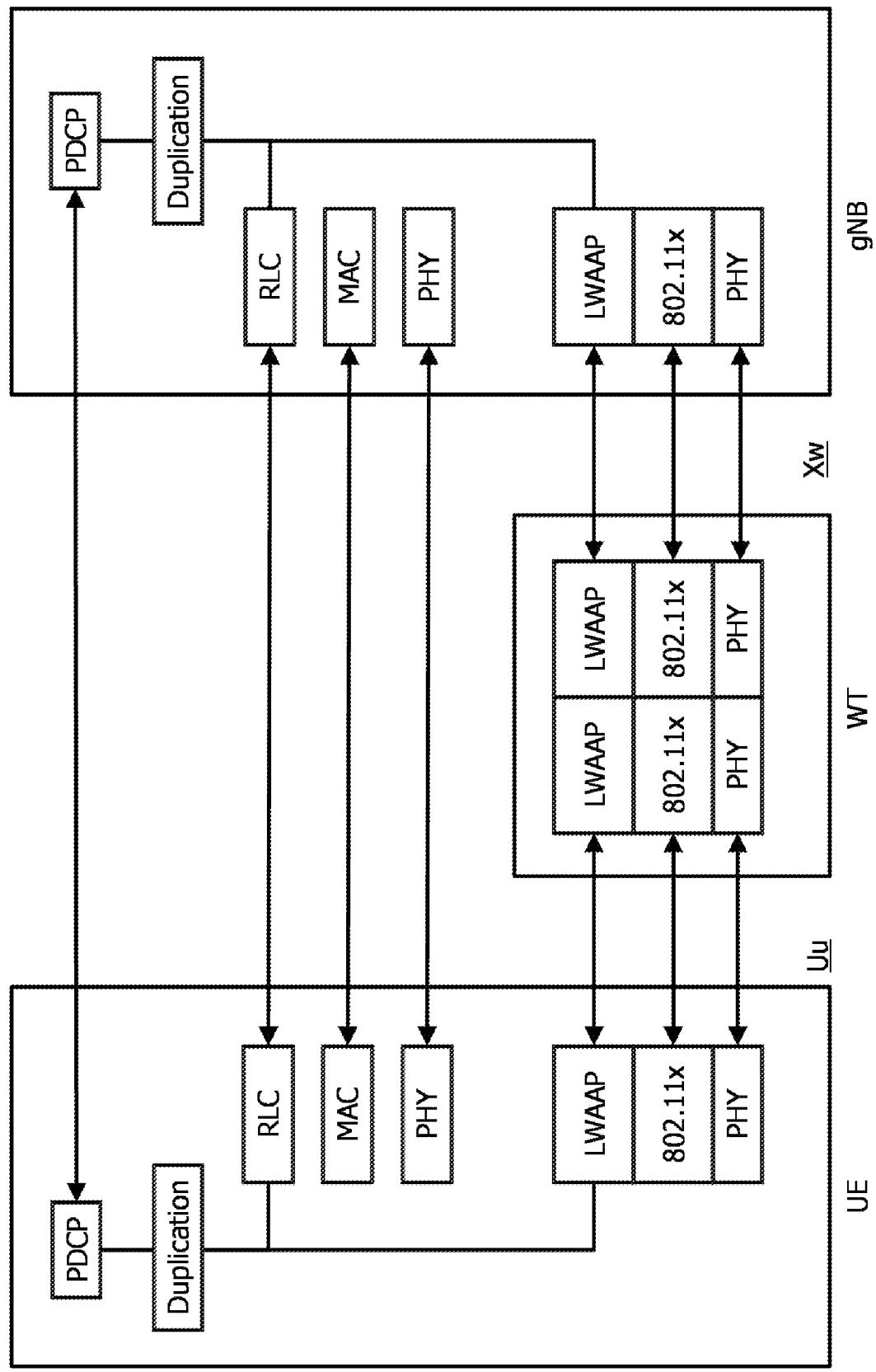
FIG. 7 is a diagram illustrating an example of a protocol stack of a communication system of FIG. 6.

FIG. 7 is a diagram illustrating an example of a protocol stack of the communication system of FIG. 6. In the following drawings, UE indicates the terminal device 100, WT indicates the relay device 300, and gNB indicates the base station device 200.

The base station device 200 and the terminal device 100 support the PDCP layer, the RLC layer, the MAC layer, and the PHY layer in the NR. Furthermore, since the base station device 200 and the terminal device 100 are compatible with the WLAN, the base station device 200 and the terminal device 100 support the LWAAP (layer and function), 802.11x (IEEE standard, x is the standard number), and the PHY layer (physical layer corresponding to the layer 1 of the WLAN). Moreover, the base station device 200 and the terminal device 100 each include a duplication layer (duplication function), and support transmission of duplicated data in the DC duplication and reception of the duplicated data.

Since the relay device 300 relays communication between the terminal device 100 and the base station device 200 in the WLAN, the relay device 300 is compatible with the LWAAP, 802.11x, and the PHY layer. The relay device 300 is connected to the base station device 200 by, for example, an Xw interface.

By processing the PDCP data received from the terminal device 100 by the NR and data received from the relay device 300 by the WLAN and processed by the LWAAP by the duplication layer, the base station device 200 converges a data packet by the PDCP layer.

With this, the relay device 300 may relay communication between the terminal device and the base station device in the 5G.

<1.2 Pattern 2>

Figure 8:
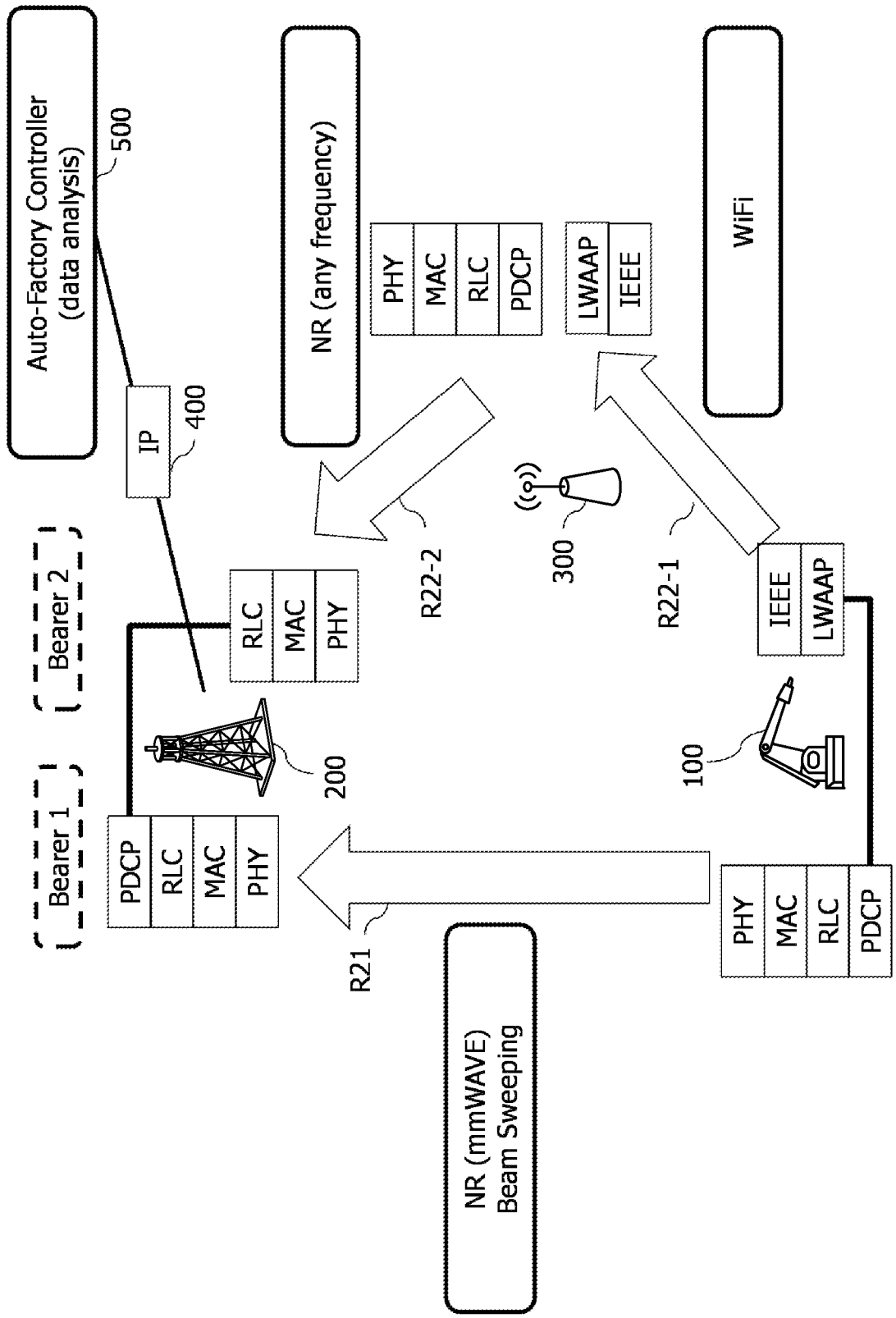
FIG. 8 is a diagram illustrating an example of the data transmission (pattern 2) in the DC duplication.

FIG. 8 is a diagram illustrating an example of the data transmission (pattern 2) in the DC duplication. The terminal device 100 performs data transmission by the DC duplication, for example, when an URLLC data transmission trigger occurs. The terminal device 100 transmits data by using two paths (path R21 and path R22-1) in the DC duplication.

In the path R21, the terminal device 100 performs wireless communication compatible with the NR with the base station device 200. In the data communication in the path R21, each of the base station device 200 and the terminal device 100 supports layers in the NR and transmits/receives the data. The layers supported by the base station device 200 and the terminal device 100 in the path R21 include, for example, the PHY layer, the MAC layer, the RLC layer, and the PDCP layer.

On the other hand, in the path R22-1, the terminal device 100 performs wireless communication compatible with Wi-Fi with the relay device 300. The relay device 300 uses the LWAAP to convert, for example, received data into data that may be transmitted by the NR.

When the relay device 300 receives the data via the path R22-1, the relay device 300 uses a path R22-2 to transmit the data to the base station device 200. With this configuration, the relay device 300 relays the data transmitted by the terminal device 100 to the base station device 200.

The relay device 300 transmits, for example, PDCP data to the base station device 200 by using the path R22-2 compatible with an NR. Note that the NR in the path R22-2 may also be in the same frequency band, or may also be in a different frequency band as the NR in the path R21. For example, the relay device 300 performs tethering and operates as a relay station between the terminal device 100 and the base station device 200.

The base station device 200 receives data via each of the path R21 and the path R22-2. The base station device 200 transmits, for example, previously received data to the IP network 400 and transmits the data to a destination. The base station device 200 discards, for example, data that is not transmitted.

Note that the base station device 200 receives the same data (for example, with the same sequence number) from the same terminal device 100 in the NR. In other words, the base station device 200 receives the same data from the same user via two bearers (Bearer 1 and Bearer 2) of the NR. In order to solve this double reception, the base station device 200 shares processing of the PDCP layer among a plurality of bearers.

Figure 9:
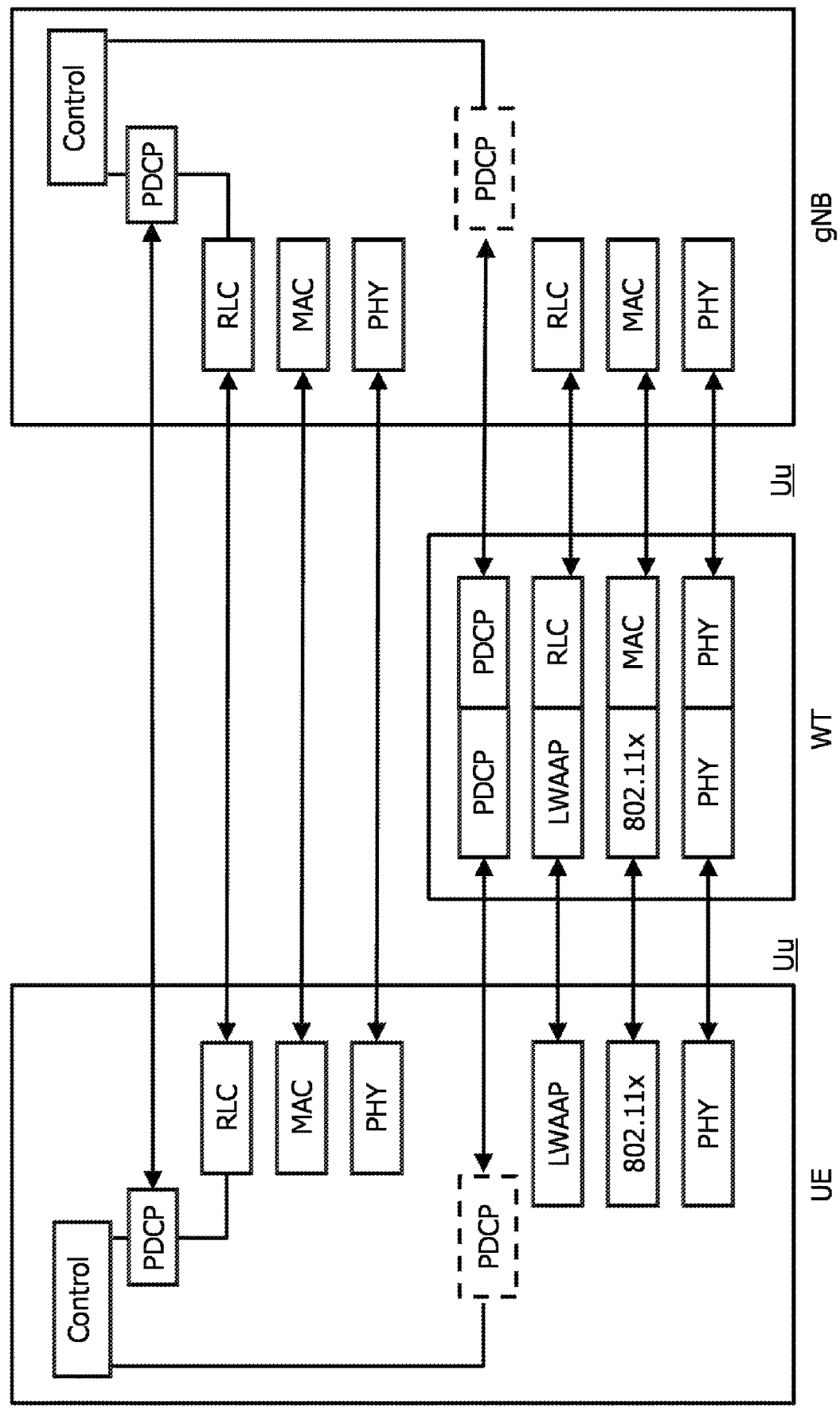
FIG. 9 is a diagram illustrating an example of a protocol stack of a communication system of FIG. 8.

FIG. 9 is a diagram illustrating an example of a protocol stack of the communication system of FIG. 8. The base station device 200 and the terminal device 100 support the PDCP layer, the RLC layer, the MAC layer, and the PHY layer in the NR. Furthermore, since the terminal device 100 is compatible with the WLAN, the terminal device 100 supports the LWAAP, 802.11x, and the PHY layer of the WLAN. Moreover, the base station device 200 and the terminal device 100 each include a duplication layer (duplication function), and support transmission of duplicated data in the DC duplication and reception of the duplicated data.

Since the relay device 300 relays communication of the terminal device 100 in the WLAN, the relay device 300 is compatible with the LWAAP, 802.11x, and the PHY layer of the WLAN. Furthermore, since the relay device 300 relays communication with the base station device 200 in the NR, the relay device 300 supports the PDCP layer, the RLC layer, the MAC layer, and the PHY layer in the NR. The relay device 300 is connected to the base station device 200 by, for example, a Uu interface.

By processing the PDCP data received from the terminal device 100 by the NR and data received from the relay device 300 by the WLAN and processed by the LWAAP by the duplication layer, the base station device 200 converges a data packet by the PDCP layer.

Note that, the base station device 200 and the terminal device 100 may also share the PDCP layer for data transmission/reception with the relay device 300 (dotted line portion of FIG. 9) and the PDCP layer for data transmission/reception with the terminal device 100 or the base station device 200. Furthermore, the base station device 200 may also share the RLC layer, the MAC layer, and the PHY layer (NR) for data transmission/reception with the relay device 300 and the RLC layer, the MAC layer, and the PHY layer (NR) in communication with the terminal device 100.

<1.3 Pattern 3>

Figure 10:
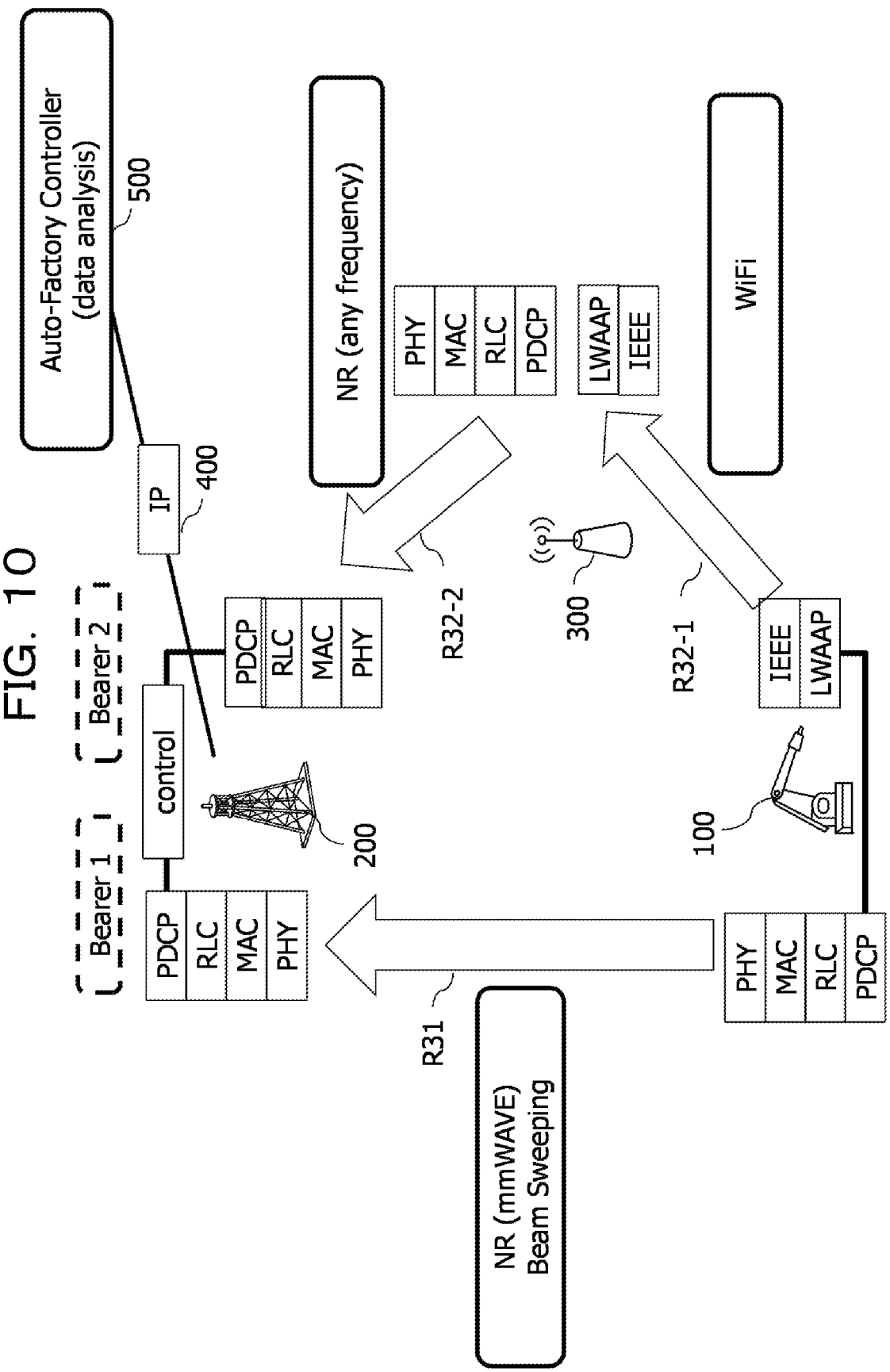
FIG. 10 is a diagram illustrating an example of the data transmission (pattern 3) in the DC duplication.

FIG. 10 is a diagram illustrating an example of the data transmission (pattern 3) in the DC duplication. Processing in a path R31, a path R32-1, and a path R32-2 of the terminal device 100 and the relay device 300 is similar to the processing in the path R21, the path R22-1, and the path R22-2 illustrated in FIG. 8.

The base station device 200 receives the same data from the same terminal device 100 in the NR. In other words, the base station device 200 receives the same data from the same user using two bearers of the NR. In order to solve this double reception, the base station device 200 includes a control layer (control function: control) that controls two pieces pf data between bearers.

Figure 11:
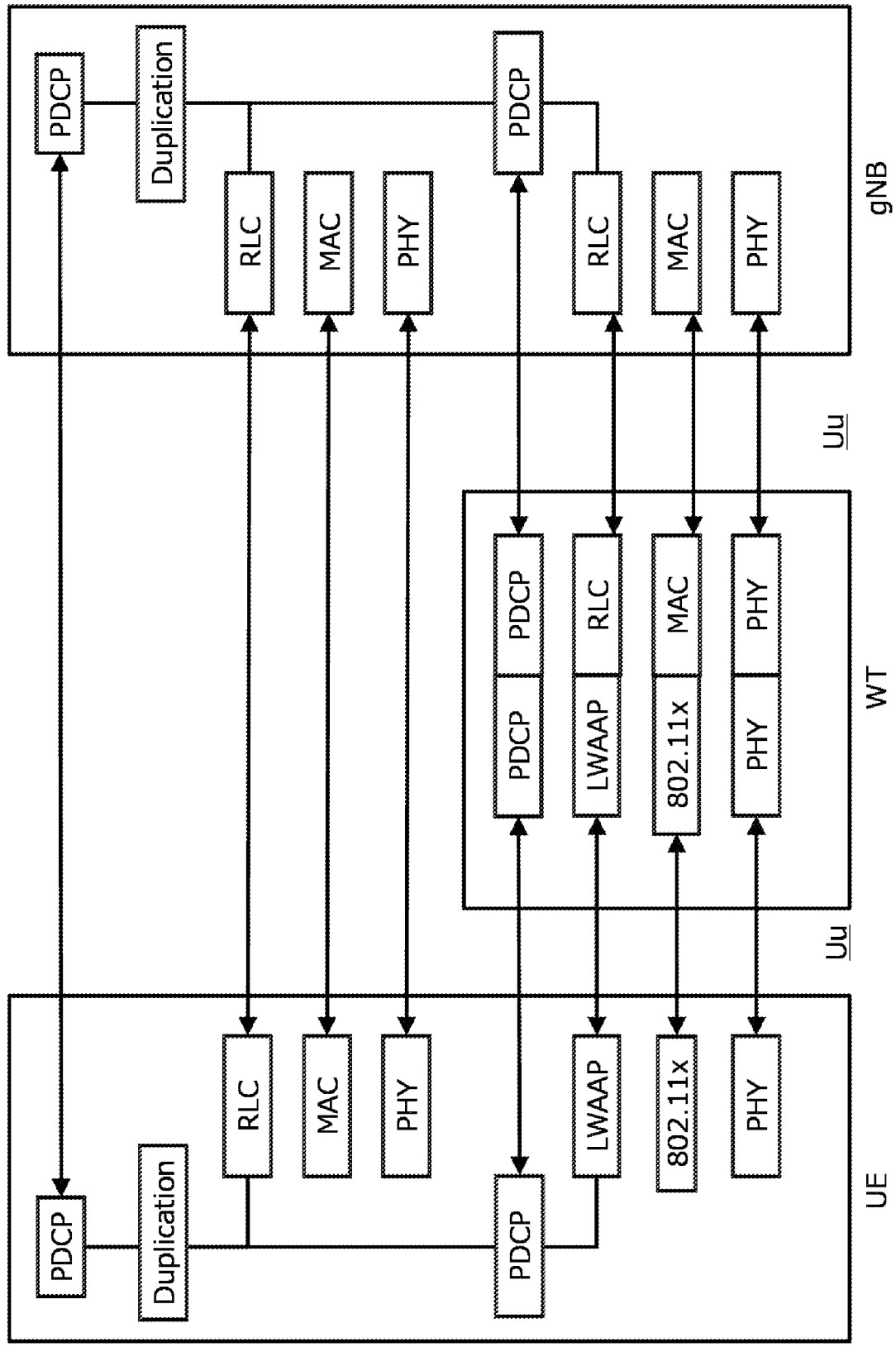
FIG. 11 is a diagram illustrating an example of a protocol stack of a communication system of FIG. 10.

FIG. 11 is a diagram illustrating an example of a protocol stack of the communication system of FIG. 10. The base station device 200 and the terminal device 100 support the PDCP layer, the RLC layer, the MAC layer, and the PHY layer in the NR. Furthermore, since the terminal device 100 is compatible with the WLAN, the terminal device 100 supports the LWAAP, 802.11x, and the PHY layer of the WLAN. Furthermore, the base station device 200 and the terminal device 100 each include a control layer (control function: control), and solve transmission/reception of the same data in a plurality of bearers in the DC duplication.

Since the relay device 300 relays communication of the terminal device 100 in the WLAN, the relay device 300 is compatible with the LWAAP, 802.11x, and the PHY layer of the WLAN. Furthermore, since the relay device 300 relays communication with the base station device 200 in the NR, the relay device 300 supports the PDCP layer, the RLC layer, the MAC layer, and the PHY layer in the NR. The relay device 300 is connected to the base station device 200 by, for example, a Uu interface.

By processing PDCP data received from the terminal device 100 by the NR and data received from the relay device 300 by the WLAN and processed by the LWAAP by the control layer, the base station device 200 converges a data packet by the PDCP layer.

Note that, the base station device 200 may also share the PDCP layer, the RLC layer, the MAC layer, and the PHY layer (NR) for data transmission/reception with the relay device 300 and the PDCP layer, the RLC layer, the MAC layer, and the PHY layer (NR) in communication with the terminal device 100.

<2. Data Transmission Sequence>

Data transmission sequence will be described below. For the data transmission sequence, three sequences will be described such as presence or absence of replies with an affirmative response (acknowledgement (ACK)) and a negative response (negative-acknowledgement (NACK)), and a case of making a scheduling request. In the following sequences, a wireless section in the WLAN and a wireless section in the NR are described in a similar manner, and a message corresponding to the affirmative response in the WLAN and the NR is expressed as ACK, and a message corresponding to the negative response in the WLAN and the NR is expressed as NACK in a similar manner.

<2.1 Sequence 1>

Figure 12:
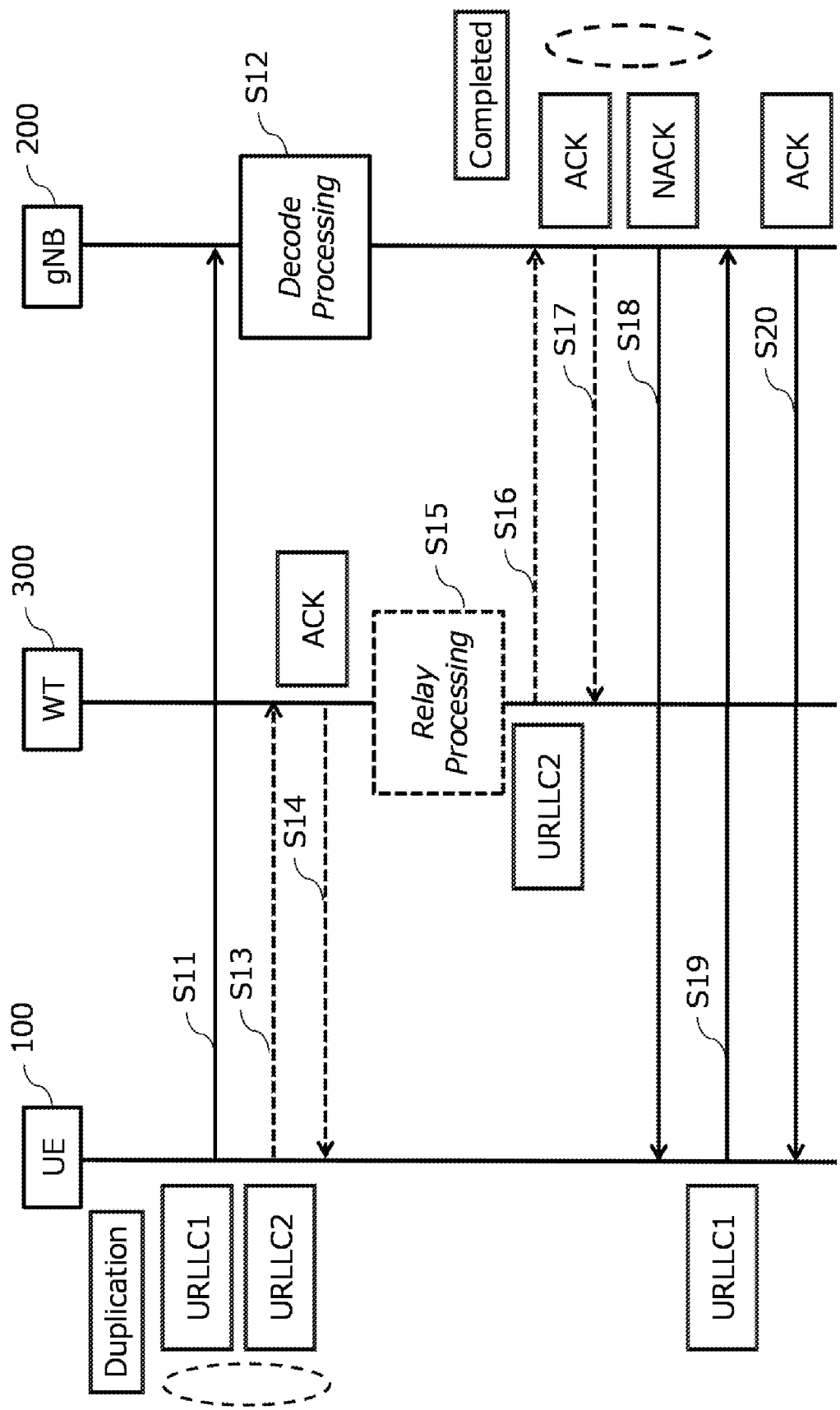
FIG. 12 is a diagram illustrating an example of a sequence 1 for transmitting a NACK to the terminal device 100.

FIG. 12 is a diagram illustrating an example of a sequence 1 for transmitting a NACK to the terminal device 100. The terminal device 100 duplicates data when the DC duplication is performed. Hereinafter, the duplicated data will be expressed as URLLC 1 and URLLC 2. The terminal device 100 transmits the URLLC 1 to the base station device 200 (S11).

The base station device 200 performs processing such as decoding on the received URLLC 1 (S12).

Moreover, the terminal device 100 transmits the URLLC 2 to the relay device 300 (S13).

When the relay device 300 receives the URLLC 2 without error, the relay device 300 transmits an ACK to the terminal device 100 (S14). Then, the relay device 300 performs relay processing (S15) and transmits the URLLC 2 to the base station device 200 (S16).

When the base station device 200 receives the URLLC 2 without error, the base station device 200 transmits an ACK to the relay device 300 (S17). Then, the base station device 200 transmits the URLLC 2 to the IP network 400 (not illustrated). Moreover, the base station device 200 transmits a NACK to the terminal device 100 (S18).

When the terminal device 100 receives the NACK, the terminal device 100 retransmits the URLLC 1 (S19). Then, when the base station device 200 receives the URLLC 1 without error, the base station device 200 transmits an ACK to the terminal device 100 (S20).

Note that, the base station device 200 may also transmit data to the IP network 400 at the timing when the data is received from either one of the terminal device 100 or the relay device 300 without error, without waiting by for reception of data from another device. Furthermore, the base station device 200 may also transmit both the data received from the terminal device 100 and the relay device 300 to the IP network 400.

<2.2 Sequence 2>

Figure 13:
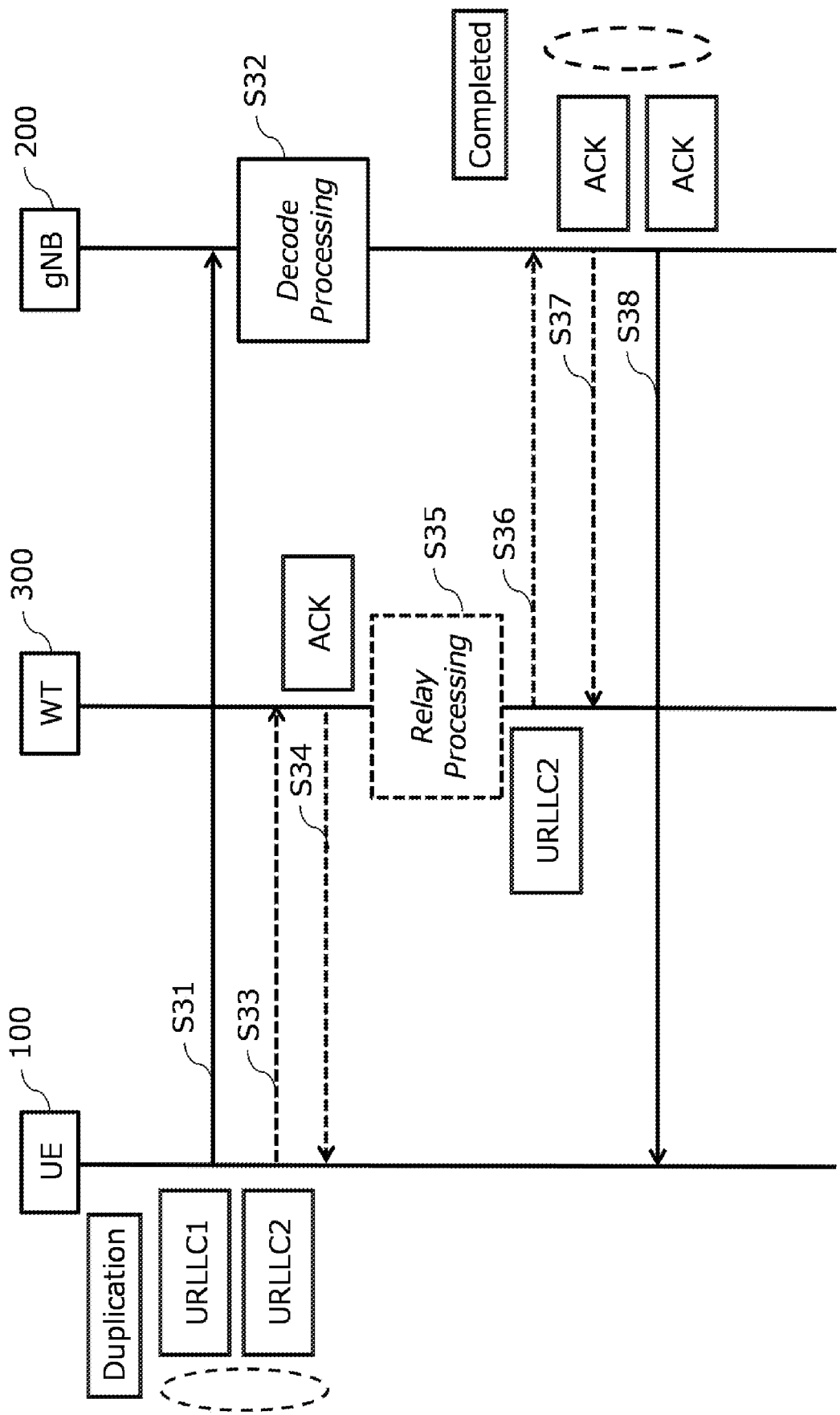
FIG. 13 is a diagram illustrating an example of a sequence 2 for transmitting an ACK to the terminal device 100.

FIG. 13 is a diagram illustrating an example of a sequence 2 for transmitting an ACK to the terminal device 100. Processing S31 to processing S36 are similar to the processing S21 to the processing S26 in FIG. 11.

When the base station device 200 receives the URLLC 2 without error, the base station device 200 transmits an ACK to the relay device 300 (S37). Then, the base station device 200 transmits the URLLC 2 to the IP network 400 (not illustrated). Moreover, the base station device 200 transmits an ACK to the terminal device 100 (S38). In this case, unlike the sequence 1, the terminal device 100 does not retransmit the URLLC 1.

Note that the timing when the base station device 200 transmits the ACK to the terminal device 100 may also be, for example, the timing when it is recognized that the URLLC 1 has been received without error in the processing S31.

<2.3 Sequence 3>

Figure 14:
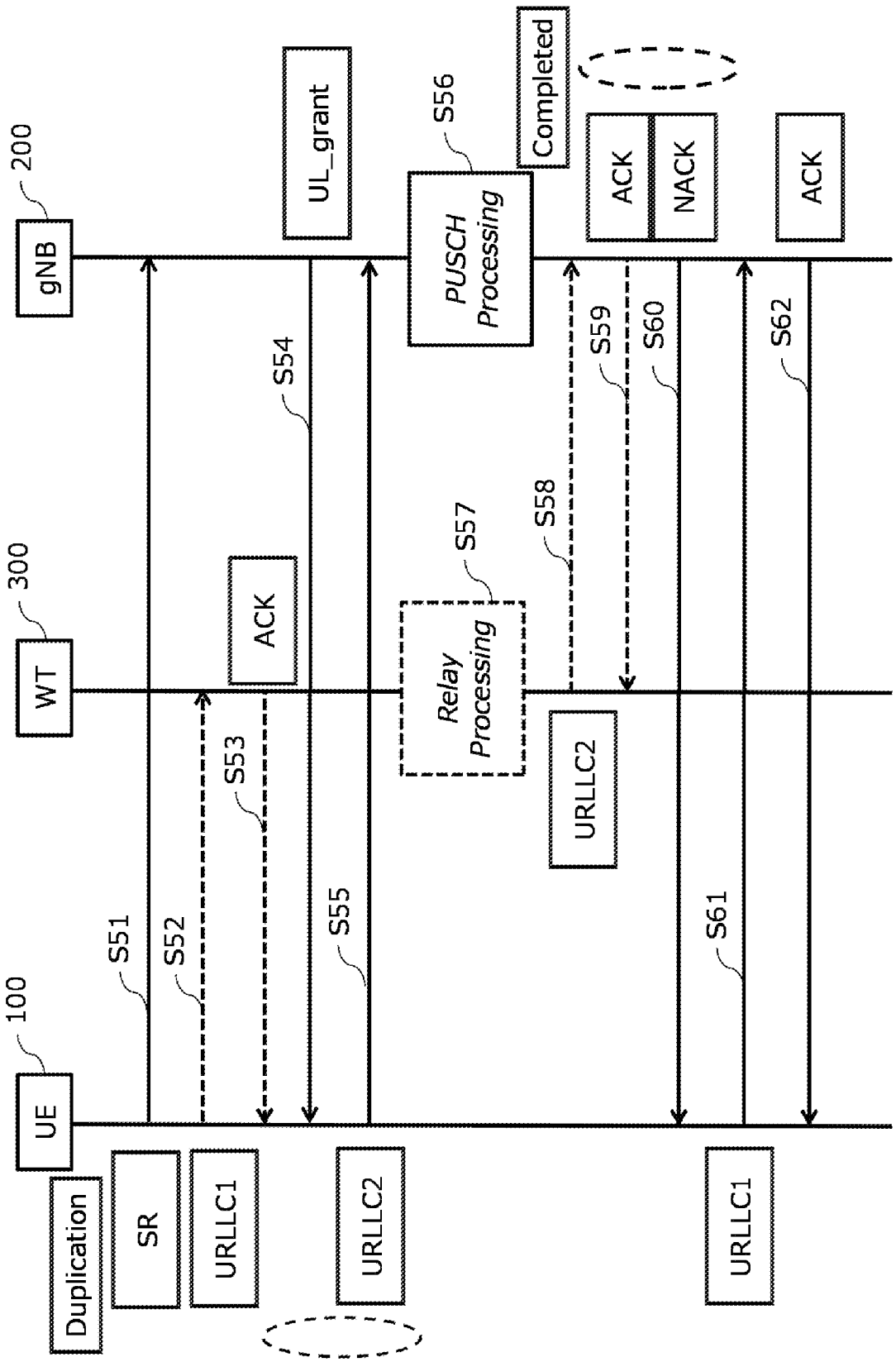
FIG. 14 is a diagram illustrating an example of a sequence 3 with wireless resource allocation.

FIG. 14 is a diagram illustrating an example of a sequence 3 with wireless resource allocation. The terminal device 100 duplicates data when the DC duplication is performed.

The terminal device 100 transmits, to the base station device 200, a scheduling request (SR) requesting wireless resource allocation (S51). Then, the terminal device 100 transmits the URLLC 1 to the relay device 300 (S52).

When the relay device 300 receives the URLLC 1 without error, the relay device 300 transmits an ACK to the terminal device 100 (S53).

When the base station device 200 receives the SR (S51), the base station device 200 allocates wireless resources, and transmits, to the terminal device 100, UL_grant, which is a message including information regarding the allocated wireless resources (S54).

When the terminal device 100 receives the UL_grant (S54), the terminal device 100 transmits the URLLC 2 to the base station device 200 by using the allocated wireless resources (S55).

When the base station device 200 receives the URLLC 2, the base station device 200 performs processing in PUSCH (S56).

The relay device 300 performs relay processing (S57) and transmits the URLLC 2 to the base station device 200 (S58).

When the base station device 200 receives the URLLC 2 without error, the base station device 200 transmits an ACK to the relay device 300 (S59). Then, the base station device 200 transmits the URLLC 2 to the IP network 400 (not illustrated). Moreover, the base station device 200 transmits a NACK to the terminal device 100 (S60).

Thereafter, processing S61 and processing S62 are similar to the processing S19 and the processing S20 in FIG. 11.

Other Embodiments

The first embodiment and the second embodiment may also be combined. Furthermore, each of the patterns of the data transmission processing and each of the patterns of the sequences in the second embodiment may also be combined. Furthermore, in the first and second embodiments, data transmission in a direction (uplink direction) from the terminal device 100 (or 10) to the base station device 200 (or 20) has been described. However, the first and second embodiments may also be applied to data transmission in a reverse direction (downlink direction). In the case of the downlink direction, for example, the base station device 200 (or 20) receives data transmitted from the IP network 400 to the terminal device 100 (or 10), duplicates the data, and transmits the duplicated data through two paths. The terminal device 100 (or 10) performs processing on, for example, data received first.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station device in a communication system including a terminal device, the base station device, and a relay device that relays communication between the terminal device and the base station device, the base station device comprising:
   a processor configured to perform, when the terminal device performs wireless communication by using both a first wireless communication method that is a wireless communication method with the base station device and a second wireless communication method that is a wireless communication method with the relay device, data communication by converging the wireless communication in a convergence layer in the first wireless communication method; and
   a communicator configured to:
      identify, when the relay device relays, by the first wireless communication method between the relay device and the base station device, first data that is transmitted and/or received by the second wireless communication method between the terminal device and the relay device, a bearer in the first wireless communication method to which the first data belongs,
      identify, when the relay device relays, by the second wireless communication method between the relay device and the base station device, second data that is transmitted and/or received by the second wireless communication method between the terminal device and the relay device, a bearer in the first wireless communication method to which the second data belongs, and transmit and/or receive the first and second data.

2. The base station device according to claim 1, wherein the communicator is further configured to:

convert, when the relay device relays data to the base station device by the second wireless communication method, the data received by the second wireless communication method into data received by the first wireless communication method, and identify a bearer in the first wireless communication method, to which the converted data belongs.

3. The base station device according to claim 1, wherein the processor is further configured to share, when the relay device relays data to the base station device by the first wireless communication method, processing of two pieces of data received in the first wireless communication method by the convergence layer in the first wireless communication method, between each of bearers of the two pieces of data.

4. The base station device according to claim 1, wherein the processor is further configured to:

perform, when the relay device relays data to the base station device by the first wireless communication method, processing of the convergence layer in the first wireless communication method for each of two pieces of data received by the first wireless communication method, and, perform, according to each result of the performed processing of the convergence layer, the data communication control by using each of bearers of the two pieces of data as one bearer.

5. The base station device according to claim 1, wherein the first wireless communication method includes a wireless communication method that conforms to a communication standard of fifth generation mobile communication, and the second wireless communication method includes a wireless communication method that conforms to a communication standard of a wireless local area network (WLAN).

6. The base station device according to claim 1, wherein the convergence layer in the first wireless communication method includes a packet data convergence protocol (PDCP) layer.

7. A communication system comprising:

a terminal device;

a base station device; and a relay device configured to relay communication between the terminal device and the base station device, wherein the terminal device includes:

a first communicator configured to perform communication with the base station device by using a first wireless communication method, and a second communicator configured to perform communication with the relay device by using a second wireless communication method, the relay device includes:

a first processor configured to convert, when the first wireless communication method is used to perform communication with the base station device, data received from the terminal device into data of the first wireless communication method, and convert data received from the base station device into data of the second wireless communication method, relays communication between the base station device and the terminal device, and the base station device includes:

a second processor configured to perform, when the terminal device performs wireless communication by using both the first wireless communication method and the second wireless communication method, data communication by converging the wireless communication in a convergence layer in the first wireless communication method; and a third communicator configured to:

identify, when the relay device relays, by the first wireless communication method between the relay device and the base station device, first data transmitted and/or received by the second wireless communication method between the terminal device and the relay device, a bearer in the first wireless communication method to which the first data belongs, identify, when the relay device relays, by the second wireless communication method between the relay device and the base station device, second data that is transmitted and/or received by the second wireless communication method between the terminal device and the relay device, a bearer in the first wireless communication method to which the second data belongs, and transmit and/or receive the first and second data.

* * * * *